US007349985B2

(12) United States Patent
Gilmartin et al.

(10) Patent No.: US 7,349,985 B2
(45) Date of Patent: Mar. 25, 2008

(54) METHOD, SYSTEM AND COMPUTER PROGRAM PRODUCT FOR CALCULATING A VLAN LATENCY MEASURE

(75) Inventors: Neil Gilmartin, Atlanta, GA (US); David Granfors, Alpharetta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 938 days.

(21) Appl. No.: 10/720,644

(22) Filed: Nov. 24, 2003

(65) Prior Publication Data

US 2005/0122983 A1    Jun. 9, 2005

(51) Int. Cl.
G06F 15/173    (2006.01)
(52) U.S. Cl. .................... 709/242; 370/395.53
(58) Field of Classification Search ............... 709/242; 370/395.53
See application file for complete search history.

(56) References Cited

U.S. PATENT DOCUMENTS

| | | | |
|---|---|---|---|
| 5,684,800 A | 11/1997 | Dobbins | |
| 5,825,772 A | 10/1998 | Dobbins | |
| 5,946,308 A | 8/1999 | Dobbins | |
| 5,949,788 A | 9/1999 | Friedman et al. | |
| 6,092,113 A | 7/2000 | Maeshima et al. | |
| 6,104,701 A | 8/2000 | Avargues | |
| 6,112,251 A | 8/2000 | Rijhsinghani | |
| 6,147,995 A | 11/2000 | Dobbins | |
| 6,151,324 A | 11/2000 | Belser | |
| 6,208,649 B1 | 3/2001 | Kloth | |
| 6,681,232 B1 * | 1/2004 | Sistanizadeh et al. | 707/104.1 |
| 6,778,498 B2 | 8/2004 | McDysan | |
| 6,912,232 B1 | 6/2005 | Duffield et al. | |
| 6,914,905 B1 | 7/2005 | Yip | |
| 7,028,083 B2 * | 4/2006 | Levine et al. | 709/223 |

(Continued)

OTHER PUBLICATIONS

Martin et al., "Effects of communication latency, overhead, and bandwidth in a cluster architecture", ACM SIGARCH Computer Architecture News, Proceedings of the 24th annual international symposium on Computer architecture ISCA '97, vol. 25 Issue 2 Publisher: ACM Press.*

(Continued)

*Primary Examiner*—Jason D Cardone
*Assistant Examiner*—William J Goodchild
(74) *Attorney, Agent, or Firm*—Cantor Colburn LLP

(57) ABSTRACT

A method for calculating a multi-point VLAN latency measure. The method includes receiving a plurality of links for a VLAN. Each link has a first side and a second side and includes a latency value, a count of access switches on the first side of the link and a count of access switches on the second side of the link. A latency counter is initialized to zero. For each link in the VLAN, the count of access switches on the first side of the link is multiplied by the count of access switches on the second side of the link to derive a count of paths that include the link. The count of paths that include the link is multiplied by the latency value associated with the link to derive a total latency for the link. The latency counter is incremented by the total latency value for the link. Once all of the links have been processed, the latency counter is divided by the number of paths in the VLAN to derive the multi-point VLAN latency measure for the VLAN.

17 Claims, 3 Drawing Sheets

U.S. PATENT DOCUMENTS

| | | |
|---|---|---|
| 7,092,389 B2 | 8/2006 | Chase et al. |
| 2002/0031142 A1 | 3/2002 | Metin et al. |
| 2002/0054595 A1 | 5/2002 | Ambe et al. |
| 2002/0120727 A1* | 8/2002 | Curley et al. ............... 709/223 |
| 2003/0067928 A1 | 4/2003 | Gonda |
| 2003/0149788 A1* | 8/2003 | Saint Etienne et al. ..... 709/238 |
| 2003/0169694 A1 | 9/2003 | Seaman |
| 2003/0172188 A1 | 9/2003 | Hasegawa et al. |
| 2004/0042416 A1 | 3/2004 | Ngo et al. |
| 2004/0081180 A1 | 4/2004 | De Silva et al. |
| 2004/0098500 A1 | 5/2004 | Liu et al. |
| 2004/0146006 A1 | 7/2004 | Jackson |
| 2004/0196790 A1 | 10/2004 | Balakrishnan et al. |
| 2004/0249916 A1 | 12/2004 | Graves et al. |
| 2005/0066036 A1 | 3/2005 | Gilmartin |

OTHER PUBLICATIONS

Fineberg, Victoria, "A Practical Architecture for Implementing End-to-End QoS in an IP Network", Communications Magazine, IEEE, vol. 40, Issue 1, Jan. 2002, pp. 122-130.*

U.S. Appl. No. 10/677,009, filed Sep. 19, 2003, Neil Gilmartin et al.

U.S. Appl. No. 10/666,069, filed Sep. 19, 2003, Neil Gilmartin.

"IEEE Standards for Local and Metropolitan Area Networks: Virtual Bridge Local Area Networks", Lan Man Standards Committee of the IEEE Computer Society, Dec. 8, 1998, 34p, IEEE Std 802.1q-1998, The Institute of Electrical and Electronics Engineers, New York, New York, United States of America.

* cited by examiner

US 7,349,985 B2

METHOD, SYSTEM AND COMPUTER PROGRAM PRODUCT FOR CALCULATING A VLAN LATENCY MEASURE

FIELD OF THE INVENTION

The present disclosure relates generally to calculating a VLAN latency measure and in particular, to methods of calculating a multi-point VLAN latency measure without needing to know all of the details of the connection topology of the VLAN.

BACKGROUND OF THE INVENTION

Computer networks carry data between various devices. The data may be carried in connection-based links, such as the virtual circuits in an asynchronous transfer mode (ATM) network. Data may also be carried between devices in network segments where data is broadcast to all of a plurality of devices on the segment via a broadcast-type medium. An example of the latter is an Ethernet network. It is typically convenient to set up local area networks (LANs) using a broadcast type medium over which devices can share data.

In some circumstances, for example, where a LAN is required to connect devices that are geographically distant from one another, the LAN may be broken into separate segments. Within each segment, devices (e.g., switches) can exchange data by way of a broadcast-type medium. The segments may be connected to one another by way of connection-based links such as physical transport lines. Such a LAN may be referred to as a virtual LAN (VLAN). The VLAN may be thought of as a logical web of connections over physical transports.

Metro-Ethernet networks are based on VLANs within the Ethernet network of a given metropolitan area. A VLAN is the interconnection, in a tree structure topology, of any number of access switches for a given customer within the larger service provider Ethernet network. The VLAN tree structure implies, that in a VLAN there can be only one path from any one access switch to another access switch. In order to provide Service Level Agreements (SLAs), a VLAN provider must be able to measure the average latency associated with traversing a VLAN. A latency measure can be calculated manually by listing all the possible paths (including the links) in a VLAN, measuring a latency value for each link and adding up the results for each path. As a VLAN becomes larger and includes more access switches and therefore more paths, it becomes increasingly complex and difficult to trace each path and to arrive at an average latency measure for the VLAN.

SUMMARY OF THE INVENTION

Embodiments of the present invention include a method for calculating a multi-point VLAN latency measure. The method includes receiving a plurality of links for a VLAN. Each link has a first side and a second side and includes a latency value, a count of access switches on the first side of the link and a count of access switches on the second side of the link. A latency counter is initialized to zero. For each link in the VLAN, the count of access switches on the first side of the link is multiplied by the count of access switches on the second side of the link to derive a count of paths that include the link. The count of paths that include the link is multiplied by the latency value associated with the link to derive a total latency for the link. The latency counter is incremented by the total latency value for the link. Once all of the links have been processed, the latency counter is divided by the number of paths in the VLAN to derive the multi-point VLAN latency measure for the VLAN.

Additional embodiments of the present invention include a method for calculating a multi-point to multi-point VLAN latency measure. The method includes receiving a plurality of links for a VLAN. Each link includes a latency value, a count of access switches on a first side of the link and a count of access switches on a second side of the link. A multi-point to multi-point VLAN latency measure that is responsive to the links is calculated for the VLAN.

Further embodiments of the present invention include a system for calculating a multi-point VLAN latency measure. The system includes a network and a host system in communication with the network. The host system includes application software to implement a method including receiving a plurality of links for a VLAN via the network. Each link has a first side and a second side and includes a latency value, a count of access switches on the first side of the link and a count of access switches on the second side of the link. A latency counter is initialized to zero. For each link in the VLAN, the count of access switches on the first side of the link is multiplied by the count of access switches on the second side of the link to derive a count of paths that include the link. The count of paths that include the link is multiplied by the latency value associated with the link to derive a total latency for the link. The latency counter is incremented by the total latency value for the link. Once all of the links have been processed, the latency counter is divided by the number of paths in the VLAN to derive the multi-point VLAN latency measure for the VLAN.

Still further embodiments of the present invention include a computer program product for calculating a multi-point VLAN latency measure. The computer program product includes a storage medium readable by a processing circuit and stores instructions for execution by the processing circuit for facilitating a method that includes receiving a plurality of links for a VLAN. Each link has a first side and a second side and includes a latency value, a count of access switches on the first side of the link and a count of access switches on the second side of the link. A latency counter is initialized to zero. For each link in the VLAN, the count of access switches on the first side of the link is multiplied by the count of access switches on the second side of the link to derive a count of paths that include the link. The count of paths that include the link is multiplied by the latency value associated with the link to derive a total latency for the link. The latency counter is incremented by the total latency value for the link. Once all of the links have been processed, the latency counter is divided by the number of paths in the VLAN to derive the multi-point VLAN latency measure for the VLAN.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

Exemplary embodiments of the present invention implement a method to calculate a latency measure for a selected VLAN. The VLAN latency measure is the average latency of every end-to-end path in the VLAN. In other words, the latency measure represents the time, on average, that it takes a customer to traverse the physical network that is specific to the customer's VLAN. The VLAN latency measure may be utilized as input to creating and monitoring Service Level Agreements (SLAs) put into place between VLAN service providers and VLAN customers. Exemplary embodiments of the present invention include techniques for optimizing the calculation of the latency measure to avoid the proliferation of calculations implied by the combinatorial nature of calculating a VLAN latency measure.

Figure 1:
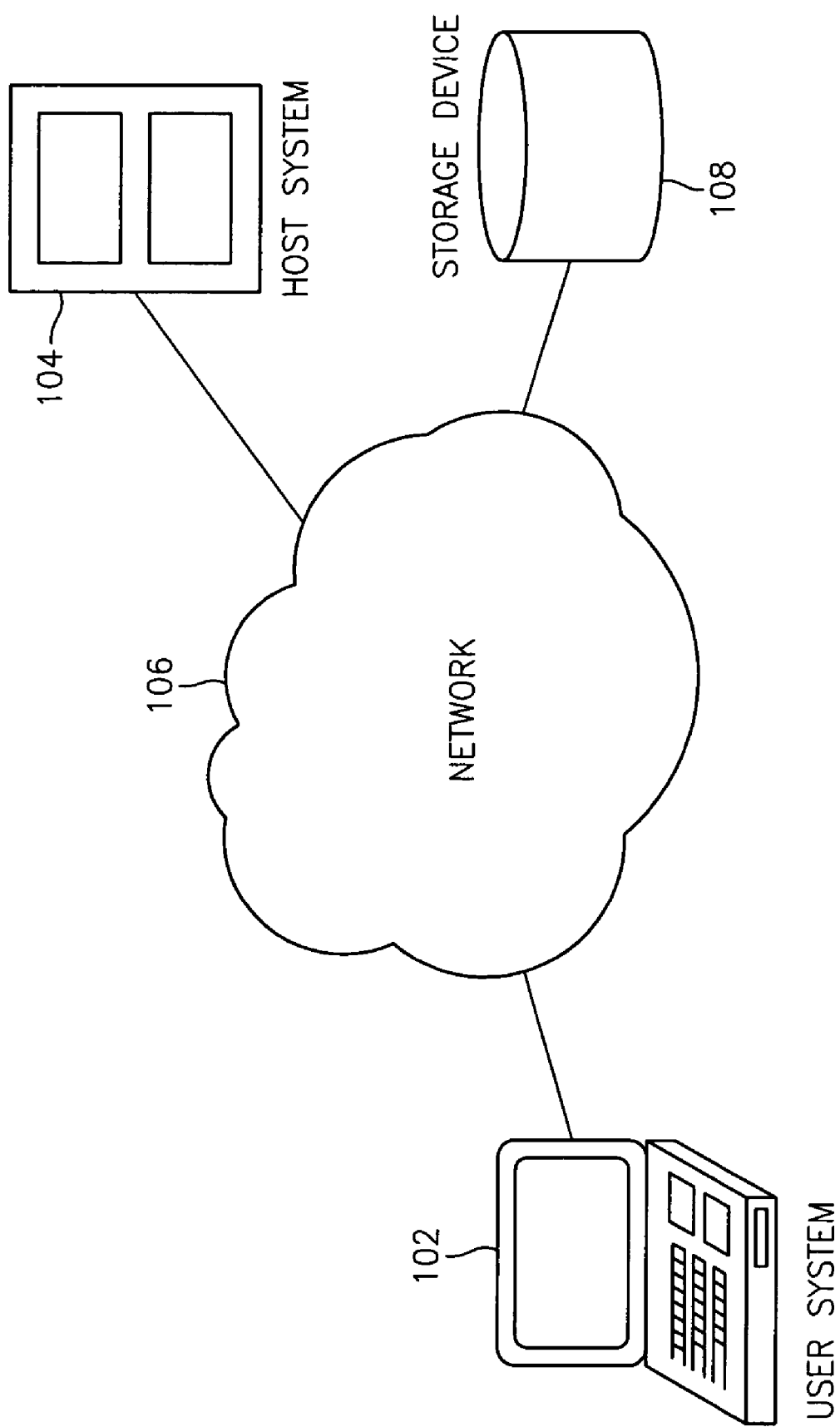
FIG. 1 is a block diagram of an exemplary system for calculating a multi-point VLAN latency measure in accordance with exemplary embodiments of the present invention.

FIG. 1 is a block diagram of an exemplary system for calculating a multi-point VLAN latency measure in accordance with exemplary embodiments of the present invention. The exemplary system includes a host system 104 for executing a VLAN latency measure calculation. The system in FIG. 1 also includes one or more user systems 102 through which VLAN technicians located at one or more geographic locations may contact the host system 104 to initiate the execution of the latency measure calculation application. In exemplary embodiments of the present invention, the host system 104 executes the latency measure calculation application and the user system 102 is coupled to the host system 104 via a network 106. In alternate exemplary embodiments, the user system 102 is directly connected to the host system 104. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and LAN) so that not all user systems 102 are coupled to the host system 104 through the same network. One or more of the user systems 102 and the host system 104 may be connected to the network 106 in a wireless fashion.

The storage device 108 depicted in FIG. 1 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host system 104. The storage device 108 includes interim data utilized to calculate the VLAN latency measure. In addition, the storage device 108 includes access to operational system support data such as a database of existing VLANs, including the access switches and hub switches associated with each VLAN and the links associated with each VLAN. The storage device 108 also includes access to, or can cause to be derived, the number/count of access switches on each side of each link in each VLAN and a latency measurement value for each link. In exemplary embodiments of the present invention, the host system 104 operates as a database server and coordinates access to application data including data stored on storage device 108. Access to data contained storage device 108 may be restricted based on user characteristics.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may reside behind a firewall to prevent unauthorized access to the host system 104 and enforce any limitations on authorized access. A firewall may be implemented using conventional hardware and/or software as is known in the art.

The host system 104 may also operate as an application server. The host system 104 executes one or more computer programs to calculate a VLAN latency measure. One or more application programs within the host system 104 share information to support the calculation of a VLAN latency measure. The processing of the calculation of a VLAN latency measure may be shared by a user system 102 and the host system 104 by providing an application (e.g., a java applet) to the user system 102. As previously described, it is understood that separate servers may be utilized to implement the network server functions and the application server functions. Alternatively, the network server, the firewall, and the application server may be implemented by a single server executing computer programs to perform the requisite functions.

Figure 2:
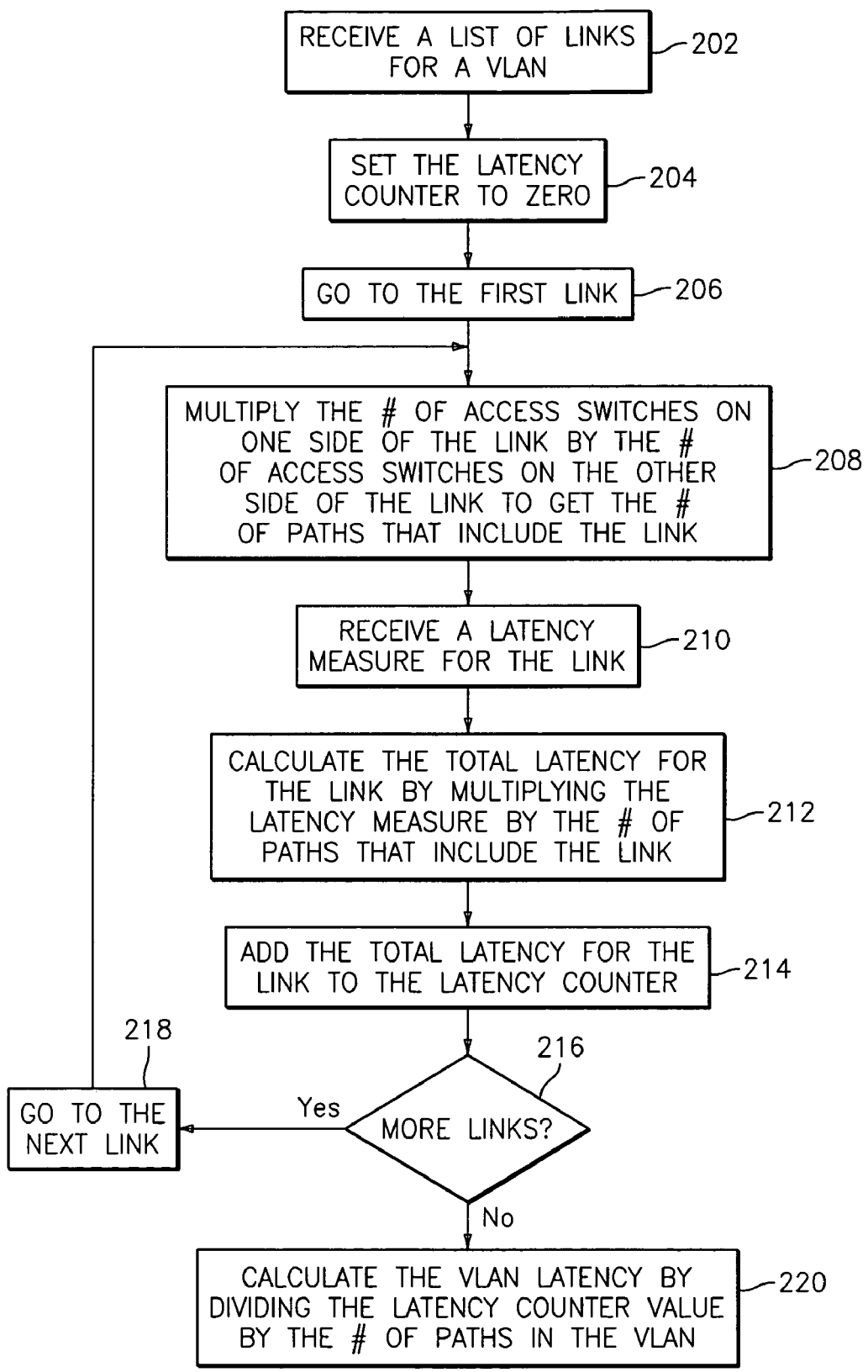
FIG. 2 is a flow diagram of an exemplary process for calculating a multi-point VLAN latency measure in accordance with exemplary embodiments of the present invention.

FIG. 2 is a flow diagram of an exemplary process for calculating a multi-point VLAN latency measure in accordance with exemplary embodiments of the present invention. At step 202, a list of links for a VLAN is received. In exemplary embodiments of the present invention, the list of links for a VLAN is received in response to a request from a user to calculate the VLAN latency measure for a particular VLAN. In addition, the list of links contained in the VLAN may be received from an operational support system and accessed via the storage device 108. At step 204, the latency counter is set to zero and at step 206, the first link is retrieved from the list of links. It is not necessary that the links be processed in any particular order as long as all of the links are processed by the time the calculation is complete.

Next, a series of steps, from step 208 through step 216 are performed for each link contained in the VLAN. At step 208, the number/count of access switches on one side of the link is multiplied by the number/count of access switches on the other side of the link to get the number of paths between access switches in the VLAN that include the link. In exemplary embodiments of the present invention, the count of access switches located on each side of the link is stored in the storage device 108. This data may be collected and stored as part of the initialization of a new VLAN and then updated as the VLAN is updated. If the data was not collected during the initialization of the VLAN, then it may be created based on data stored in the operational support system (e.g., by going through each link in the VLAN and counting the number of access switches on each side of the link). This data may then be stored with each link and utilized for future latency measure calculations (assuming it is updated if the VLAN changes) or recreated each time a latency measure is requested.

At step 210, a latency measure for the link is received. In exemplary embodiments of the present invention, the latency measure for the link is collected and stored in the storage device 108 at a pre-determined frequency. The pre-determined frequency may be based on implementation or customer requirements and includes an actual measurement of the latency associated with the link. The latency for the link may be measured in any manner known in the art including using a shadow router attached to each switch in the network. Exemplary embodiments of the present invention utilize a latency number for each fifteen-minute interval for each link in the VLAN that is arrived at based on data collected from the shadow router. Next, at step 212, the total latency for the link is calculated by multiplying the latency measure for the link by the number of paths that include the link. At step 214, the total latency for the link is added into the latency counter. A check is made at step 216 to see if there are more links in the VLAN. If there are more links, then step 218 is performed to go to the next link and then processing of the link begins at step 208.

Once the total latency for all links in the VLAN have been added into the latency counter, step 220 is performed. At step 220, the VLAN latency is calculated by dividing the latency counter by the number/count of paths in the VLAN. The number of paths in the VLAN may be calculated by multiplying the number of access switches (n) by one less than the number of access switches (n−1) and then dividing by two (i.e., $n*(n-1)/2$).

Figure 3:
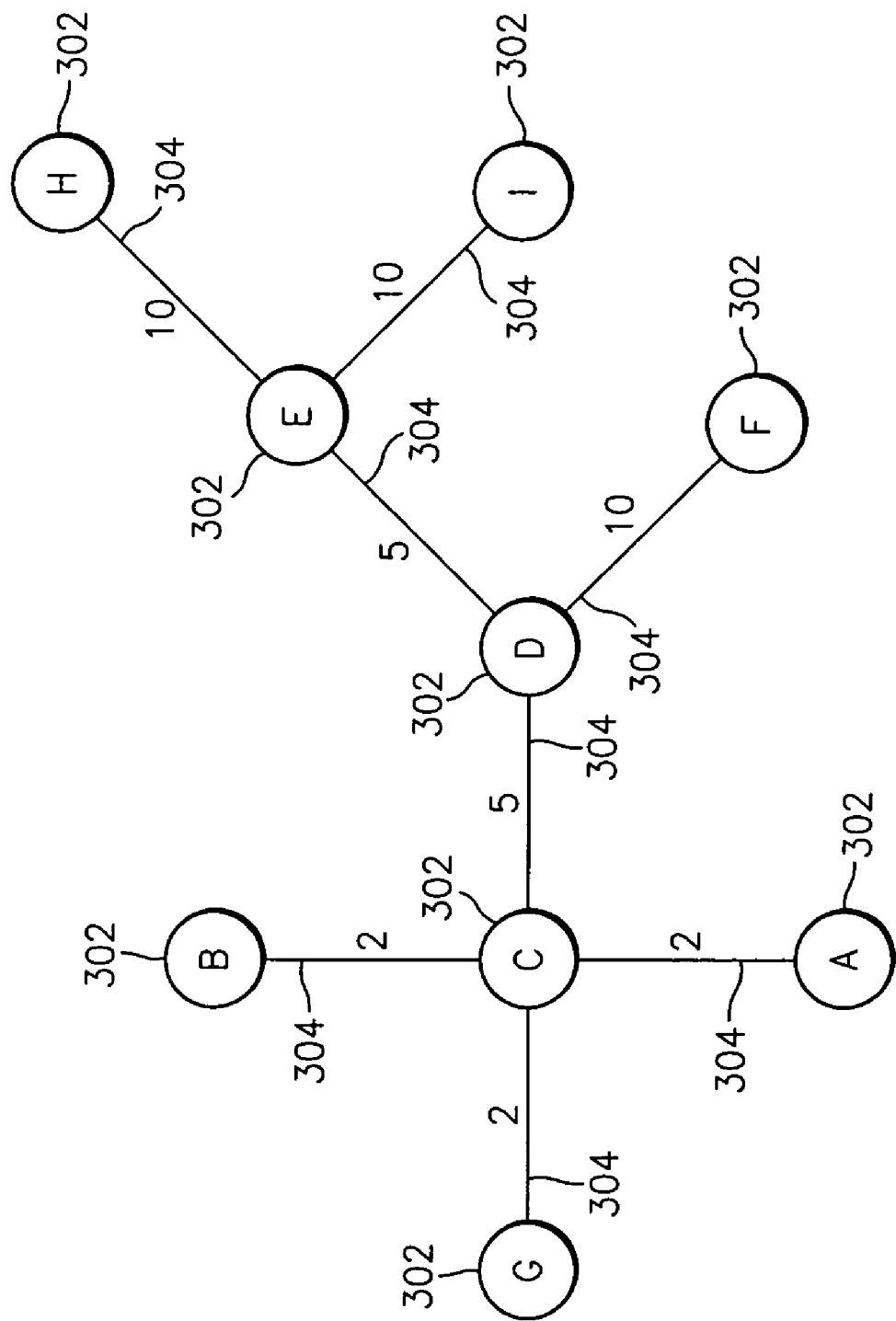
FIG. 3 is a block diagram of access switches and physical transport lines that may be utilized in exemplary embodiments of the present invention.

The following simplified example is intended to illustrate the processing that occurs when the steps described in reference to FIG. 2 are performed by exemplary embodiments of the present invention. FIG. 3 is a block diagram including access switches and physical transport lines that may be utilized in exemplary embodiments of the present invention. FIG. 3 includes six access switches 302: "A"; "B"; "G"; "F"; "H" and "I". FIG. 3 also includes three hub switches 302: "C", "D" and "E". Each switch 302 is connected to another switch 302 via a link 304. The VLAN links 304 depicted in FIG. 3 are labeled with their respective latency. There are fifteen paths (i.e., $n*(n-1)/2$ or $(6*(5)/2)$) contained in the VLAN depicted in FIG. 3:

| GCB | BCA | ACDEH | HEI | IEDF |
| GCA | BCDEH | ACDEI | HEDF | |
| GCDEH | BCDEI | ACDF | | |
| GCDEI | BCDF | | | |
| GCDF | | | | |

The list of links (described in terms of their end-points or switches 302) for the VLAN depicted in FIG. 3 includes: GC; BC; AC; CD; DE; DF; EH and EI. This is an example of the kind of list that may be received at step 202 in FIG. 2. Next, the latency counter is set to zero (see step 204 in FIG. 2). In this example, the first link selected is GC. GC has one access switch on the "G" side ("G") and five access switches on the "C" side ("A", "B", "F", "H", "I"). These numbers are multiplied (see step 208 in FIG. 2) to determine that five paths include the GC link. This can be verified by counting the number of paths above that contain a GC or CG. Five of them contain this combination: GCB; GCA; GCDEH; GCDEI and GCDF.

The latency measure for the GC link, as depicted in FIG. 3, is two. Therefore, two (the latency measure of the GC link) is multiplied by five (the number of paths that contain the GC link), to arrive at the value ten which is the total latency for the link GC (see step 212 n FIG. 2). This total latency for the link GC is added into the latency counter (see step 214 in FIG. 2). This process is continued for all the links contained in the VLAN depicted in FIG. 3. The value contained in the latency counter is then divided by the number of paths in the VLAN, resulting in the VLAN latency measure (see step 220 in FIG. 3). The process is summarized in the following table:

| Link | Access Switch Side 1 | Access Switch Side 2 | Latency | Total Link Latency |
|---|---|---|---|---|
| GC | 1 (G) | 5 (ABFIH) | 2 | 10 (1 × 5 × 2) |
| BC | 1 (B) | 5 (GAFIH) | 2 | 10 (1 × 5 × 2) |
| AC | 1 (A) | 5 (GBFHI) | 2 | 10 (1 × 5 × 2) |
| CD | 3 (ABG) | 3 (FHI) | 5 | 45 (3 × 3 × 5) |
| DE | 4 (ABFG) | 2 (HI) | 5 | 40 (4 × 2 × 5) |
| DF | 5 (ABGHI) | 1 (F) | 10 | 50 (5 × 1 × 10) |
| EH | 5 (ABGFI) | 1 (H) | 10 | 50 (5 × 1 × 10) |
| EI | 5 (ABGFH) | 1 (I) | 10 | 50 (5 × 1 × 10) |
| Latency Counter: | | | | 265 |
| VLAN Latency Measure | | | | 7.667 (265/15) |

Exemplary embodiments of the present invention provide multi-point to multi-point latency measurements. Exemplary embodiments of the present invention provide a reduction in the number of calculations and amount of topology information required to calculate a multi-point VLAN latency measure. The information needed from an operational system, to perform the VLAN latency measure calculation, includes the list of links in the VLAN, the latency of each link and the number of access switches on each side of the link. The amount of topology data required is minimized because each of the individual paths ($n*(n-1)$ of them) do not need to be re-drawn or identified in order to calculate the VLAN latency measurement using exemplary embodiments of the present invention. In addition, the number of calculations does not grow geometrically as new access switches and links are added but instead, one new calculation is added for each link that is added. This can result in large savings in processing time as a multi-point VLAN latency measure may be calculated quickly even for very large VLANs.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for calculating a multi-point VLAN latency measure, the method comprising:
    receiving a plurality of links for a VLAN having a total number of VLAN paths, each of the links having a first side and a second side and including a latency value, a count of access switches on the first side of the link and a count of access switches on the second side of the link;
    initializing a latency counter to zero;
    for each of the links in the VLAN:
        multiplying the count of access switches on the first side of the link by the count of access switches on the second side of the link to derive a count of paths that include the link;
        multiplying the count of paths that include the link by the latency value to derive a total latency for the link; and
        incrementing the latency counter by the total latency value for the link; and
    dividing the latency counter by the total number of VLAN paths to derive the multi-point VLAN latency measure for the VLAN.

2. The method of claim 1 wherein the total number of VLAN path is calculated by multiplying a total count of access switches in the VLAN by one less than the total count of access switches in the VLAN and then dividing the result by two.

3. The method of claim 1 wherein the links are received from an operational support system.

4. The method of claim 1 further comprising transmitting a request to an operational support system for the plurality of links for the VLAN, wherein the count of access switches on the first side of the link and the count of access switches on the second side of the link are calculated by the operational support system in response to the transmitting.

5. The method of claim 1 wherein the count of access switches on the first side of the link and the count of access switches on the second side of the link are calculated by an operational support system as part of initializing the VLAN.

6. The method of claim 1 wherein the latency value is updated on a periodic basis.

7. The method of claim 1 wherein the receiving is in response to a user request for the multi-point VLAN latency measure for the VLAN.

8. The method of claim 1 further comprising outputting the multi-point VLAN latency measure.

9. The method of claim 1 further comprising outputting the multi-point VLAN latency measure to a service level agreement system.

10. The method of claim 1 wherein the VLAN is an Ethernet VLAN.

11. A computer program product for calculating a multi-point VLAN latency measure, the computer program product comprising:
    a storage medium readable by a processing circuit and storing instructions for execution by the processing circuit for facilitating a method comprising:
        receiving a plurality of links for a VLAN having a total number of VLAN paths, each of the links having a first side and a second side and including a latency value, a count of access switches on the first side of the link and a count of access switches on the second side of the link;
        initializing a latency counter to zero;
        for each of the links in the VLAN:
            multiplying the count of access switches on the first side of the link by the count of access switches on the second side of the link to derive a count of paths that include the link;
            multiplying the count of paths that include the link by the latency value to derive a total latency for the link; and
            incrementing the latency counter by the total latency value for the link; and
        dividing the latency counter by the total number of VLAN paths to derive the multi-point VLAN latency measure for the VLAN.

12. A system for calculating a multi-point VLAN latency measure, the system comprising:
    a network;
    a host system in communication with the network, the host system including application software to implement a method comprising:
        receiving via the network a plurality of links for a VLAN having a total number of VLAN paths, each of the links having a first side and a second side and including a latency value, a count of access switches on the first side of the link and a count of access switches on the second side of the link;
        initializing a latency counter to zero;
        for each of the links in the VLAN:
            multiplying the count of access switches on the first side of the link by the count of access switches on the second side of the link to derive a count of paths that include the link;
            multiplying the count of paths that include the link by the latency value to derive a total latency for the link; and incrementing the latency counter by the total latency value for the link; and dividing the latency counter by the total number of VLAN paths to derive the multi-point VLAN latency measure for the VLAN.

13. The system of claim 12 further comprising a storage device in communication with the network wherein the plurality of links are stored in the storage device.

14. The system of claim 13 wherein the method further comprises outputting the multi-point VLAN latency measure to the storage device.

15. The system of claim 12 wherein the network is the Internet.

16. The system of claim 12 wherein the network in an intranet.

17. The system of claim 12 further comprising a user system in communication with the network, wherein the receiving is performed in response to a request from the user system for the multi-point VLAN latency measure for the VLAN.

* * * * *